(12) United States Patent
Smith (10) Patent No.: US 9,031,698 B2
(45) Date of Patent: May 12, 2015

(54) SERPENTINE ROBOTIC CRAWLER

(71) Applicant: Sarcos LC, Salt Lake City, UT (US)

(72) Inventor: Fraser M. Smith, Salt Lake City, UT (US)

(73) Assignee: Sarcos LC, Salt Lake City, UT (US)

( * ) Notice: Subject to any disclaimer, the term of this patent is extended or adjusted under 35 U.S.C. 154(b) by 117 days.

(21) Appl. No.: 13/665,669

(22) Filed: Oct. 31, 2012

(65) Prior Publication Data

US 2014/0121835 A1    May 1, 2014

(51) Int. Cl.
| G05B 15/00 | (2006.01) |
| G05B 19/00 | (2006.01) |
| B25J 5/00 | (2006.01) |
| B62D 55/06 | (2006.01) |
| B62D 55/065 | (2006.01) |
| B62D 55/07 | (2006.01) |

(52) U.S. Cl.
CPC ............. *B25J 5/005* (2013.01); *B62D 55/06* (2013.01); *B62D 55/0655* (2013.01); *B62D 55/07* (2013.01)

(58) Field of Classification Search
CPC .................................................. B62D 55/0655
USPC ......... 700/245–264; 180/9.46, 9.44, 9.4, 901; 280/5.2, 5.22, 138.1, 138.2
See application file for complete search history.

(56) References Cited

U.S. PATENT DOCUMENTS

| 1,107,874 A | 8/1914 | Appleby |
| 1,112,460 A | 10/1914 | Leavitt |
| 1,515,756 A | 11/1924 | Roy |
| 1,975,726 A | 10/1934 | Martinage |
| 2,311,475 A | 2/1943 | Schmeiser |
| 2,312,072 A | 2/1943 | Broadwater |
| 2,329,582 A | 9/1943 | Bishop |
| 2,345,763 A | 4/1944 | Mayne |
| 2,701,169 A | 2/1955 | Cannon |
| 2,850,147 A | 9/1958 | Hill |

(Continued)

FOREIGN PATENT DOCUMENTS

| CA | 2512299 | 9/2004 |
| CN | 1603068 | 4/2005 |

(Continued)

OTHER PUBLICATIONS

U.S. Appl. No. 12/814,304, filed Jun. 11, 2010; Stephen C. Jacobsen; office action dated Oct. 24, 2013.

(Continued)

*Primary Examiner* — Bhavesh V Amin (57) ABSTRACT

A robotic crawler having a non-dedicated smart control system is disclosed. Such a crawler can include a first drive subsystem, a second drive subsystem, a multi-degree of freedom linkage subsystem coupling the first and second drive subsystems, and a non-dedicated, smart control device removably supported about one of the first drive subsystem, the second drive subsystem, and the linkage subsystem. The smart control device is configured to initiate and control operational functionality within the robotic crawler upon being connected to the robotic crawler. The crawler can also include a communication subsystem functionally coupled between the smart control device and the serpentine robotic crawler, the communication subsystem facilitating control by the smart control device of at least one of the first drive subsystem, the second drive subsystem, and the linkage subsystem.

20 Claims, 7 Drawing Sheets

(56) References Cited

U.S. PATENT DOCUMENTS

| | | |
|---|---|---|
| 2,933,143 A | 4/1960 | Robinson |
| 2,967,737 A | 1/1961 | Moore |
| 3,037,571 A | 6/1962 | Zelle |
| 3,060,972 A | 10/1962 | Sheldon |
| 3,107,643 A | 10/1963 | Edwards |
| 3,166,138 A | 1/1965 | Dunn, Jr. |
| 3,190,286 A | 6/1965 | Stokes |
| 3,215,219 A | 11/1965 | Forsyth et al. |
| 3,223,462 A | 12/1965 | Dalrymple |
| 3,266,059 A | 8/1966 | Stelle |
| 3,284,964 A | 11/1966 | Saito |
| 3,311,424 A | 3/1967 | Taylor |
| 3,362,492 A | 1/1968 | Hansen |
| 3,387,896 A | 6/1968 | Sobota |
| 3,489,236 A | 1/1970 | Goodwin |
| 3,497,083 A | 2/1970 | Anderson |
| 3,565,198 A | 2/1971 | Ames |
| 3,572,325 A | 3/1971 | Bazell |
| 3,609,804 A | 10/1971 | Morrison |
| 3,650,343 A | 3/1972 | Helsell |
| 3,700,115 A | 10/1972 | Johnson et al. |
| 3,707,218 A | 12/1972 | Payne |
| 3,712,481 A | 1/1973 | Harwood |
| 3,715,146 A | 2/1973 | Robertson |
| 3,757,635 A | 9/1973 | Hickerson |
| 3,808,078 A | 4/1974 | Snellman |
| 3,820,616 A | 6/1974 | Juergens |
| 3,841,424 A | 10/1974 | Purcell |
| 3,864,983 A | 2/1975 | Jacobsen |
| 3,933,214 A | 1/1976 | Guibord |
| 3,934,664 A | 1/1976 | Pohjola |
| 3,974,907 A | 8/1976 | Shaw |
| 4,015,553 A | 4/1977 | Middleton |
| 4,051,914 A | 10/1977 | Pohjola |
| 4,059,315 A | 11/1977 | Jolliffe |
| 4,068,905 A | 1/1978 | Black |
| 4,107,948 A | 8/1978 | Maolaug |
| 4,109,971 A | 8/1978 | Black |
| 4,132,279 A | 1/1979 | Van der Lende |
| 4,218,101 A | 8/1980 | Thompson |
| 4,260,053 A | 4/1981 | Onodera |
| 4,332,317 A | 6/1982 | Bahre |
| 4,332,424 A | 6/1982 | Thompson |
| 4,339,031 A | 7/1982 | Densmore |
| 4,393,728 A | 7/1983 | Larson |
| 4,396,233 A | 8/1983 | Slaght |
| 4,453,611 A | 6/1984 | Stacy, Jr. |
| 4,483,407 A | 11/1984 | Iwamoto et al. |
| 4,489,826 A | 12/1984 | Dubson |
| 4,494,417 A | 1/1985 | Larson |
| 4,551,061 A | 11/1985 | Olenick |
| 4,589,460 A | 5/1986 | Albee |
| 4,621,965 A | 11/1986 | Wilcock |
| 4,636,137 A | 1/1987 | Lemelson |
| 4,646,906 A | 3/1987 | Wilcox, Jr. |
| 4,661,039 A | 4/1987 | Brenholt |
| 4,671,774 A | 6/1987 | Owsen |
| 4,700,693 A | 10/1987 | Lia |
| 4,706,506 A | 11/1987 | Lestelle |
| 4,712,969 A | 12/1987 | Kimura |
| 4,713,896 A | 12/1987 | Jennens |
| 4,714,125 A | 12/1987 | Stacy, Jr. |
| 4,727,949 A | 3/1988 | Rea |
| 4,736,826 A | 4/1988 | White et al. |
| 4,752,105 A | 6/1988 | Barnard |
| 4,756,662 A | 7/1988 | Tanie |
| 4,765,795 A | 8/1988 | Rebman |
| 4,784,042 A | 11/1988 | Paynter |
| 4,796,607 A | 1/1989 | Allred, III |
| 4,806,066 A | 2/1989 | Rhodes |
| 4,815,319 A | 3/1989 | Clement |
| 4,815,911 A | 3/1989 | Bengtsson |
| 4,818,175 A | 4/1989 | Kimura |
| 4,828,339 A | 5/1989 | Thomas |
| 4,848,179 A | 7/1989 | Ubhayakar |
| 4,862,808 A | 9/1989 | Hedgecoxe |
| 4,878,451 A | 11/1989 | Siren |
| 4,900,218 A | 2/1990 | Sutherland |
| 4,909,341 A | 3/1990 | Rippingale |
| 4,924,153 A | 5/1990 | Toru et al. |
| 4,932,491 A | 6/1990 | Collins, Jr. |
| 4,932,831 A | 6/1990 | White et al. |
| 4,936,639 A | 6/1990 | Pohjola |
| 4,997,790 A | 3/1991 | Woo et al. |
| 5,018,591 A | 5/1991 | Price |
| 5,021,798 A | 6/1991 | Ubhayakar |
| 5,022,812 A | 6/1991 | Coughlan |
| 5,046,914 A | 9/1991 | Holland et al. |
| 5,080,000 A | 1/1992 | Bubic |
| 5,130,631 A | 7/1992 | Gordon |
| 5,142,932 A | 9/1992 | Moya |
| 5,172,639 A | 12/1992 | Wiesman et al. |
| 5,174,168 A | 12/1992 | Takagi |
| 5,174,405 A | 12/1992 | Carra |
| 5,186,526 A | 2/1993 | Pennington |
| 5,199,771 A | 4/1993 | James |
| 5,205,612 A | 4/1993 | Sugden et al. |
| 5,214,858 A | 6/1993 | Pepper |
| 5,219,264 A | 6/1993 | McClure et al. |
| 5,252,870 A | 10/1993 | Jacobsen |
| 5,297,443 A | 3/1994 | Wentz |
| 5,317,952 A | 6/1994 | Immega |
| 5,337,732 A | 8/1994 | Grundfest |
| 5,337,846 A | 8/1994 | Ogaki et al. |
| 5,350,033 A | 9/1994 | Kraft |
| 5,354,124 A | 10/1994 | James |
| 5,363,935 A * | 11/1994 | Schempf et al. ............... 180/9.1 |
| 5,386,741 A | 2/1995 | Rennex |
| 5,413,454 A | 5/1995 | Movsesian |
| 5,426,336 A | 6/1995 | Jacobsen |
| 5,428,713 A | 6/1995 | Matsumaru |
| 5,435,405 A | 7/1995 | Schempf |
| 5,440,916 A | 8/1995 | Stone et al. |
| 5,443,354 A | 8/1995 | Stone et al. |
| 5,451,135 A | 9/1995 | Schempf |
| 5,465,525 A | 11/1995 | Mifune et al. |
| 5,466,056 A | 11/1995 | James |
| 5,469,756 A | 11/1995 | Feiten |
| 5,516,249 A | 5/1996 | Brimhall |
| 5,519,814 A | 5/1996 | Rodriguez et al. |
| 5,551,545 A | 9/1996 | Gelfman |
| 5,556,370 A | 9/1996 | Maynard |
| 5,562,843 A | 10/1996 | Yasumoto |
| 5,567,110 A | 10/1996 | Sutherland |
| 5,570,992 A | 11/1996 | Lemelson |
| 5,573,316 A | 11/1996 | Wankowski |
| 5,588,688 A | 12/1996 | Jacobsen |
| 5,672,044 A | 9/1997 | Lemelson |
| 5,697,285 A | 12/1997 | Nappi |
| 5,712,961 A | 1/1998 | Matsuo |
| 5,749,828 A | 5/1998 | Solomon |
| 5,770,913 A | 6/1998 | Mizzi |
| 5,816,769 A | 10/1998 | Bauer |
| 5,821,666 A | 10/1998 | Matsumoto |
| 5,842,381 A | 12/1998 | Feiten |
| RE36,025 E | 1/1999 | Suzuki |
| 5,878,783 A | 3/1999 | Smart |
| 5,888,235 A | 3/1999 | Jacobsen |
| 5,902,254 A | 5/1999 | Magram |
| 5,906,591 A | 5/1999 | Dario |
| 5,984,032 A | 11/1999 | Gremillion |
| 5,996,346 A | 12/1999 | Maynard |
| 6,016,385 A | 1/2000 | Yee |
| 6,030,057 A | 2/2000 | Fikse |
| 6,056,237 A | 5/2000 | Woodland |
| 6,107,795 A | 8/2000 | Smart |
| 6,109,705 A | 8/2000 | Courtemanche |
| 6,113,343 A | 9/2000 | Goldenberg et al. |
| 6,132,133 A | 10/2000 | Muro et al. |
| 6,138,604 A | 10/2000 | Anderson |
| 6,162,171 A | 12/2000 | Ng |
| 6,186,604 B1 | 2/2001 | Fikse |
| 6,203,126 B1 | 3/2001 | Harguth |
| 6,260,501 B1 | 7/2001 | Agnew |

(56) References Cited

U.S. PATENT DOCUMENTS

| | | | |
|---|---|---|---|
| 6,263,989 B1 * | 7/2001 | Won | 180/9.32 |
| 6,264,293 B1 | 7/2001 | Musselman | |
| 6,264,294 B1 | 7/2001 | Musselman et al. | |
| 6,281,489 B1 | 8/2001 | Tubel et al. | |
| 6,323,615 B1 | 11/2001 | Khairallah | |
| 6,325,749 B1 | 12/2001 | Inokuchi et al. | |
| 6,333,631 B1 | 12/2001 | Das et al. | |
| 6,339,993 B1 | 1/2002 | Comello | |
| 6,380,889 B1 | 4/2002 | Herrmann et al. | |
| 6,394,204 B1 | 5/2002 | Haringer | |
| 6,405,798 B1 | 6/2002 | Barrett et al. | |
| 6,408,224 B1 | 6/2002 | Okamoto | |
| 6,411,055 B1 | 6/2002 | Fujita | |
| 6,422,509 B1 | 7/2002 | Yim | |
| 6,430,475 B2 | 8/2002 | Okamoto | |
| 6,431,296 B1 * | 8/2002 | Won | 180/9.32 |
| 6,446,718 B1 | 9/2002 | Barrett et al. | |
| 6,450,104 B1 | 9/2002 | Grant | |
| 6,477,444 B1 | 11/2002 | Bennett et al. | |
| 6,484,083 B1 * | 11/2002 | Hayward et al. | 701/50 |
| 6,488,306 B1 | 12/2002 | Shirey et al. | |
| 6,505,896 B1 | 1/2003 | Boivin | |
| 6,512,345 B2 | 1/2003 | Borenstein | |
| 6,522,950 B1 | 2/2003 | Conca et al. | |
| 6,523,629 B1 | 2/2003 | Buttz | |
| 6,529,806 B1 | 3/2003 | Licht | |
| 6,535,793 B2 | 3/2003 | Allard | |
| 6,540,310 B1 | 4/2003 | Cartwright | |
| 6,557,954 B1 | 5/2003 | Hattori | |
| 6,563,084 B1 | 5/2003 | Bandy | |
| 6,574,958 B1 | 6/2003 | Macgregor | |
| 6,576,406 B1 | 6/2003 | Jacobsen et al. | |
| 6,595,812 B1 | 7/2003 | Haney | |
| 6,610,007 B2 | 8/2003 | Belson et al. | |
| 6,619,146 B2 | 9/2003 | Kerrebrock | |
| 6,636,781 B1 | 10/2003 | Shen et al. | |
| 6,651,804 B2 | 11/2003 | Thomas | |
| 6,652,164 B2 | 11/2003 | Stiepel et al. | |
| 6,668,951 B2 | 12/2003 | Won | |
| 6,708,068 B1 | 3/2004 | Sakaue | |
| 6,715,575 B2 | 4/2004 | Karpik | |
| 6,725,128 B2 | 4/2004 | Hogg et al. | |
| 6,772,673 B2 | 8/2004 | Seto | |
| 6,773,327 B1 | 8/2004 | Felice | |
| 6,774,597 B1 | 8/2004 | Borenstein | |
| 6,799,815 B2 | 10/2004 | Krishnan | |
| 6,820,653 B1 | 11/2004 | Schempf | |
| 6,831,436 B2 | 12/2004 | Gonzalez | |
| 6,835,173 B2 | 12/2004 | Couvillon, Jr. | |
| 6,837,318 B1 | 1/2005 | Craig | |
| 6,840,588 B2 | 1/2005 | Deland | |
| 6,866,671 B2 | 3/2005 | Tierney | |
| 6,870,343 B2 | 3/2005 | Borenstein | |
| 6,889,118 B2 | 5/2005 | Murray et al. | |
| 6,917,176 B2 | 7/2005 | Schempf | |
| 6,923,693 B2 | 8/2005 | Borgen | |
| 6,936,003 B2 | 8/2005 | Iddan | |
| 6,959,231 B2 | 10/2005 | Maeda | |
| 7,017,687 B1 | 3/2006 | Jacobsen et al. | |
| 7,020,701 B1 | 3/2006 | Gelvin et al. | |
| 7,040,426 B1 | 5/2006 | Berg | |
| 7,044,245 B2 | 5/2006 | Anhalt et al. | |
| 7,069,124 B1 | 6/2006 | Whittaker et al. | |
| 7,090,637 B2 | 8/2006 | Dankitz | |
| 7,137,465 B1 | 11/2006 | Kerrebrock | |
| 7,144,057 B1 | 12/2006 | Young et al. | |
| 7,171,279 B2 | 1/2007 | Buckingham et al. | |
| 7,188,473 B1 | 3/2007 | Asada | |
| 7,188,568 B2 | 3/2007 | Stout | |
| 7,228,203 B2 | 6/2007 | Koselka et al. | |
| 7,235,046 B2 | 6/2007 | Anhalt et al. | |
| 7,331,436 B1 | 2/2008 | Pack et al. | |
| 7,387,179 B2 | 6/2008 | Anhalt et al. | |
| 7,415,321 B2 | 8/2008 | Okazaki et al. | |
| 7,475,745 B1 | 1/2009 | DeRoos | |
| 7,539,557 B2 | 5/2009 | Yamauchi | |
| 7,546,912 B1 | 6/2009 | Pack et al. | |
| 7,597,162 B2 | 10/2009 | Won | |
| 7,600,592 B2 | 10/2009 | Goldenberg et al. | |
| 7,645,110 B2 | 1/2010 | Ogawa et al. | |
| 7,654,348 B2 | 2/2010 | Ohm et al. | |
| 7,775,312 B2 | 8/2010 | Maggio | |
| 7,798,264 B2 | 9/2010 | Hutcheson et al. | |
| 7,843,431 B2 | 11/2010 | Robbins et al. | |
| 7,845,440 B2 * | 12/2010 | Jacobsen | 180/9.46 |
| 7,860,614 B1 | 12/2010 | Reger | |
| 7,974,736 B2 | 7/2011 | Morin et al. | |
| 8,002,716 B2 | 8/2011 | Jacobsen et al. | |
| 8,042,630 B2 * | 10/2011 | Jacobsen | 180/9.46 |
| 8,162,410 B2 | 4/2012 | Hirose et al. | |
| 8,205,695 B2 | 6/2012 | Jacobsen et al. | |
| 8,393,422 B1 * | 3/2013 | Pensel | 180/9.46 |
| 2001/0037163 A1 | 11/2001 | Allard | |
| 2002/0038168 A1 | 3/2002 | Kasuga et al. | |
| 2002/0128714 A1 | 9/2002 | Manasas et al. | |
| 2002/0140392 A1 | 10/2002 | Borenstein | |
| 2002/0189871 A1 | 12/2002 | Won | |
| 2003/0000747 A1 | 1/2003 | Sugiyama | |
| 2003/0069474 A1 | 4/2003 | Couvillon, Jr. | |
| 2003/0097080 A1 | 5/2003 | Esashi | |
| 2003/0110938 A1 | 6/2003 | Seto | |
| 2003/0223844 A1 | 12/2003 | Schiele | |
| 2004/0030571 A1 | 2/2004 | Solomon | |
| 2004/0099175 A1 | 5/2004 | Perrot et al. | |
| 2004/0103740 A1 | 6/2004 | Townsend | |
| 2004/0168837 A1 | 9/2004 | Michaud | |
| 2004/0216931 A1 | 11/2004 | Won | |
| 2004/0216932 A1 | 11/2004 | Giovanetti | |
| 2005/0007055 A1 | 1/2005 | Borenstein | |
| 2005/0027412 A1 | 2/2005 | Hobson | |
| 2005/0085693 A1 | 4/2005 | Belson et al. | |
| 2005/0107669 A1 | 5/2005 | Couvillon, Jr. | |
| 2005/0115337 A1 | 6/2005 | Tarumi | |
| 2005/0166413 A1 | 8/2005 | Crampton | |
| 2005/0168068 A1 | 8/2005 | Courtemanche et al. | |
| 2005/0168070 A1 | 8/2005 | Dandurand | |
| 2005/0225162 A1 | 10/2005 | Gibbins | |
| 2005/0235898 A1 | 10/2005 | Hobson | |
| 2005/0235899 A1 | 10/2005 | Yamamoto | |
| 2005/0288819 A1 | 12/2005 | de Guzman | |
| 2006/0000137 A1 | 1/2006 | Valdivia y Alvarado et al. | |
| 2006/0005733 A1 | 1/2006 | Rastegar et al. | |
| 2006/0010702 A1 | 1/2006 | Roth | |
| 2006/0010998 A1 | 1/2006 | Lloyd et al. | |
| 2006/0070775 A1 | 4/2006 | Anhalt et al. | |
| 2006/0117324 A1 | 6/2006 | Alsafadi et al. | |
| 2006/0156851 A1 * | 7/2006 | Jacobsen et al. | 74/490.01 |
| 2006/0225928 A1 | 10/2006 | Nelson | |
| 2006/0229773 A1 | 10/2006 | Peretz | |
| 2006/0290779 A1 | 12/2006 | Reverte et al. | |
| 2007/0029117 A1 | 2/2007 | Goldenberg et al. | |
| 2007/0156286 A1 | 7/2007 | Yamauchi | |
| 2007/0193790 A1 | 8/2007 | Goldenberg et al. | |
| 2007/0260378 A1 | 11/2007 | Clodfelter | |
| 2007/0293989 A1 | 12/2007 | Norris | |
| 2008/0115687 A1 | 5/2008 | Gal et al. | |
| 2008/0164079 A1 * | 7/2008 | Jacobsen | 180/7.1 |
| 2008/0167752 A1 | 7/2008 | Jacobsen | |
| 2008/0168070 A1 | 7/2008 | Naphade | |
| 2008/0192569 A1 | 8/2008 | Ray et al. | |
| 2008/0215185 A1 | 9/2008 | Jacobsen | |
| 2008/0272647 A9 | 11/2008 | Hirose et al. | |
| 2008/0284244 A1 | 11/2008 | Hirose et al. | |
| 2009/0025988 A1 * | 1/2009 | Jacobsen et al. | 180/9.32 |
| 2009/0035097 A1 | 2/2009 | Loane | |
| 2009/0095209 A1 | 4/2009 | Jamieson | |
| 2009/0171151 A1 | 7/2009 | Choset et al. | |
| 2009/0212157 A1 | 8/2009 | Arlton et al. | |
| 2010/0030377 A1 | 2/2010 | Unsworth | |
| 2010/0036544 A1 | 2/2010 | Mashiach | |
| 2010/0258365 A1 | 10/2010 | Jacobsen | |
| 2010/0268470 A1 | 10/2010 | Kamal et al. | |
| 2010/0318242 A1 | 12/2010 | Jacobsen et al. | |
| 2012/0185095 A1 | 7/2012 | Rosenstein et al. | |

(56) References Cited

U.S. PATENT DOCUMENTS

| | | | |
|---|---|---|---|
| 2012/0205168 A1 | 8/2012 | Flynn et al. | |
| 2012/0264414 A1 | 10/2012 | Fung | |
| 2012/0277914 A1* | 11/2012 | Crow et al. | 700/259 |

FOREIGN PATENT DOCUMENTS

| | | |
|---|---|---|
| CN | 2774717 | 4/2006 |
| CN | 1970373 | 5/2007 |
| DE | 3025840 | 2/1982 |
| DE | 3626238 | 2/1988 |
| DE | 3626328 | 2/1988 |
| DE | 19617852 | 10/1997 |
| DE | 19714464 | 10/1997 |
| DE | 19704080 | 8/1998 |
| DE | 10018075 | 1/2001 |
| DE | 102004010089 | 9/2005 |
| EP | 0105418 | 4/1984 |
| EP | 0584520 | 3/1994 |
| EP | 0818283 | 1/1998 |
| EP | 0924034 | 6/1999 |
| EP | 1444043 | 8/2004 |
| EP | 1510896 | 3/2005 |
| EP | 1832501 | 9/2007 |
| EP | 1832502 | 9/2007 |
| FR | 2638813 | 5/1990 |
| FR | 2660730 | 10/1991 |
| FR | 2850350 | 7/2004 |
| GB | 1199729 | 7/1970 |
| JP | 51-106391 | 8/1976 |
| JP | 52 57625 | 5/1977 |
| JP | 52122431 | 9/1977 |
| JP | 58-89480 | 5/1983 |
| JP | SHO 58-80387 | 5/1983 |
| JP | 59139494 | 9/1984 |
| JP | 60015275 | 1/1985 |
| JP | 60047771 | 3/1985 |
| JP | 60060516 | 4/1985 |
| JP | 60139576 | 7/1985 |
| JP | SHO 60-211315 | 10/1985 |
| JP | 61001581 | 1/1986 |
| JP | SHO 61-1581 | 1/1986 |
| JP | SHO 61-180885 | 1/1986 |
| JP | SHO61-020484 | 2/1986 |
| JP | SH061-054378 | 3/1986 |
| JP | 61-075069 | 4/1986 |
| JP | 61089182 | 5/1986 |
| JP | SHO 62-36885 | 3/1987 |
| JP | 62165207 | 7/1987 |
| JP | 62-162626 | 10/1987 |
| JP | SHO 63-32084 | 3/1988 |
| JP | 63306988 | 12/1988 |
| JP | 04092784 | 3/1992 |
| JP | 4126656 | 4/1992 |
| JP | HEI 5-3087 | 1/1993 |
| JP | 05147560 | 6/1993 |
| JP | HEI05-270454 | 10/1993 |
| JP | HEI 5-286460 | 11/1993 |
| JP | 06-115465 | 4/1994 |
| JP | HEI 8-133141 | 11/1994 |
| JP | 2007-216936 | 8/1995 |
| JP | 7329841 | 12/1995 |
| JP | HEI 7-329837 | 12/1995 |
| JP | HEI 9-142347 | 6/1997 |
| JP | HEI 11-347970 | 12/1999 |
| JP | 2003-237618 | 2/2002 |
| JP | 2003-019985 | 1/2003 |
| JP | 2003-315486 | 11/2003 |
| JP | 2004/080147 A | 3/2004 |
| JP | 03535508 | 6/2004 |
| JP | 2004536634 | 12/2004 |
| JP | 2005-19331 | 1/2005 |
| JP | 2005-081447 | 3/2005 |
| JP | 2005111595 | 4/2005 |
| JP | 2006510496 | 3/2006 |
| JP | 2007-237991 | 9/2007 |
| JP | 2010-509129 | 3/2010 |
| WO | WO 87/02635 | 5/1987 |
| WO | WO 96/37727 | 11/1996 |
| WO | WO97/26039 | 7/1997 |
| WO | WO00/10073 | 2/2000 |
| WO | WO 00/10073 | 2/2000 |
| WO | WO02/16995 | 2/2002 |
| WO | WO 02/16995 | 2/2002 |
| WO | WO 02/095517 | 11/2002 |
| WO | WO03/030727 | 4/2003 |
| WO | WO03037515 | 5/2003 |
| WO | WO 2004/056537 | 7/2004 |
| WO | WO2005/018428 | 3/2005 |
| WO | WO2006068080 | 6/2006 |
| WO | WO 2008/049050 | 4/2008 |
| WO | WO2008/076194 | 6/2008 |
| WO | WO 2008/127310 A2 | 10/2008 |
| WO | WO 2008/135978 | 11/2008 |
| WO | WO 2009/009673 | 1/2009 |
| WO | WO 2010/070666 A1 | 6/2010 |
| WO | WO 2012/061932 A1 | 5/2012 |

OTHER PUBLICATIONS

U.S. Appl. No. 12/171,146, filed Jul. 10, 2008; Stephen C. Jacobsen; office action dated Mar. 6, 2013.

U.S. Appl. No. 12/814,304, filed Jun. 11, 2010; Stephen C. Jacobsen; office action dated Apr. 23, 2013.

U.S. Appl. No. 12/117,233, filed May 8, 2008; Stephen C. Jacobsen; office action dated May 6, 2013.

Schenker, et al.; "Reconfigurable robots for all terrain exploration"; 2000, CIT.

Blackburn, et al.; Improved mobility in a multi-degree-of-freedom unmanned ground vehicle; *Unmanned Ground Vehicles Technology VI*; Sep. 2, 2004; 124-134; Proceedings of SPIE vol. 5422.

U.S. Appl. No. 12/117,233, filed May 8, 2008; Stephen C. Jacobsen; office action dated Dec. 19, 2013.

U.S. Appl. No. 12/814,304, filed Jun. 11, 2010; Stephen C. Jacobsen; office action dated Feb. 10, 2014.

Iagnemma, Karl et al., "Traction control of wheeled robotic vehicles in rough terrain with application to planetary rovers." International Journal of Robotics Research, Oct.-Nov. 2004, pp. 1029-1040, vol. 23, No. 10-11.

Hirose, et al., "Snakes and strings; new robotic components for rescue operations," International Journal of Robotics Research, Apr.-May 2004, pp. 341-349, vol. 23, No. 4-5.

Paap et al., "A robot snake to inspect broken buildings," IEEE, 2000, pp. 2079-2082, Japan.

Braure, Jerome, "Participation to the construction of a salamander robot: exploration of the morphological configuration and the locomotion controller", Biologically Inspired Robotics Group, master thesis, Feb. 17, 2004, pp. 1-46.

Jacobsen, et al., Advanced intelligent mechanical sensors (AIMS), Proc. IEEE Trandsucers 1991, Jun. 24-27, abstract only, San Fransico, CA.

Jacobsen, et al., "Research robots for applications in artificial intelligence, teleoperation and entertainment", International Journal of Robotics Research, 2004, pp. 319-330, vol. 23.

Jacobsen, et al., "Multiregime MEMS sensor networks for smart structures," Procs. SPIE 6th Annual Inter. Conf. On Smart Structues and Materials, Mar. 1-5, 1999, pp. 19-32, vol. 3673, Newport Beach CA.

MacLean et al., "A digital MEMS-based strain gage for structural health monitoring," Procs. 1997 MRS Fall Meeting Symposium, Nov. 30-Dec. 4, 1997, pp. 309-320, Boston Massachusetts.

Berlin et al., "MEMS-based control of structural dynamic instability", Journal of Intelligent Material Systems and Structures, Jul. 1998 pp. 574-586, vol. 9.

Goldfarb, "Design and energetic characterization of a liquid-propellant-powered actuator for self-powered robots," IEEE Transactions On Mechatronics, Jun. 2003, vol. 8 No. 2.

Dowling, "Limbless Locomotion: Learning to crawl with a snake robot," The Robotics Institute at Carnegie Mellon University, Dec. 1997, pp. 1-150.

(56) References Cited

OTHER PUBLICATIONS

Jacobsen, Stephen; U.S. Appl. No. 11/985,320, filed Nov. 13, 2007; published as US-2008-0215185-A1; published Sep. 4, 2008.
Jacobsen, Stephen, U.S. Appl. No. 11/985,346, filed Nov. 13, 2007; published as US-2008-0136254-A1; published Jun. 12, 2008.
Jacobsen, Stephen; U.S. Appl. No. 11/985,324, filed Nov. 13, 2007; published as US-2008-0217993-A1; published Sep. 11, 2008; Aug. 28, 2011 as 8,002,365.
Jacobsen, Stephen; U.S. Appl. No. 11/985,323, filed Nov. 13, 2007; published as US-2008-0164079-A1; published Jul. 10, 2008.
Jacobsen, Stephen; U.S. Appl. No. 12/171,144, filed Jul. 10, 2008; published as US-2009-0025988-A1; published Jan. 29, 2009; issued Jul. 10, 2011 as 7,845,440.
Jacobsen, Stephen; U.S. Appl. No. 12/171,146, filed Jul. 10, 2008; published as US-2009-0030562-A1; published Jan. 29, 2009.
Jacobsen, Stephen, U.S. Appl. No. 12/151,730, filed May 7, 2008; published as US-2008-0281231-A1; published Nov. 13, 2008; issued Aug. 13, 2011 as 8,002,716.
Jacobsen, Stephen; U.S. Appl. No. 12/117,233, filed May 8, 2008; published as US-2008-0281468-A1; published Nov. 13, 2008.
Jacobsen, Stephen, U.S. Appl. No. 11/293,701, filed Dec. 1, 2005; published as US-2006-0156851-A1; published Jul. 20, 2006.
Jacobsen, Stephen, U.S. Appl. No. 11/985,336, filed Nov. 13, 2007; published as US-2008-0167752-A1; published Jul. 10, 2008.
Jacobsen, Stephen, U.S. Appl. No. 12/350,693, filed Jan. 8, 2009; published as US-2010-0174422-A1; published Jul. 8, 2010.
Jacobsen, Stephen; U.S. Appl. No. 12/694,996, filed Jan. 27, 2010; published as US-2010-0201187-A1; published Aug. 12, 2010.
Jacobsen, Stephen; U.S. Appl. No. 12/814,302, filed Jun. 11, 2010; published as US2010-0317244-A1; published Dec. 16, 2010.
Jacobsen, Stephen; U.S. Appl. No. 12/814,304, filed Jun. 11, 2010; published as US-2010-0318242-A1; published Dec. 16, 2010.
Jacobsen, Stephen; U.S. Appl. No. 12/820,881, filed Apr. 22, 2010 published as US-2010-0201185-A1 published Aug. 12, 2010.
Jacobsen, Stephen; U.S. Appl. No. 12/765,618, filed Apr. 22, 2010; published as US-2010-0201185-A1; published Aug. 12, 2010.
Revue Internationale De defense, "3-D vision and urchin" Oct. 1, 1988, p. 1292, vol. 21, No. 10, Geneve CH.
Advertisement, International Defense review, Jane's information group, Nov. 1, 1990, p. 54, vol. 23, No. 11, Great Britain.
Ren Luo "Development of a multibehavior-based mobile robot for remote supervisory control through the internet" IEEE/ ASME Transactions on mechatronics, IEEE Service Center, Piscataway, NY, Dec 1, 2000, vol. 5, No. 4.
Nilas Sueset et al., "A PDA-based high-level human-robot interaction" Robotics, Automation and Mechatronics, IEEE Conference Singapore, Dec 1-3, 2004, vol. 2, pp. 1158-1163.
Jacobsen, Stephen; U.S. Appl. No. 13/181,380, filed Jul. 12, 2011.
Simmons et al; "Coordinated Deployment of Multiple, Heterogeneous Robots"; School of Computer Science, Carnegie Mellon University, Pittsburgh PA.; Honeywell Technology Center, Minneapolis, MN; Intelligent Robot Systems, 2000; vol. 3 pp. 2254-2260.
Mehling, et al.; "A Minimally Invasive Tendril Robot for In-Space Inspection"; Biomedical Robotics and Biomechatronis, 2006.
U.S. Appl. No. 11/640,140, filed Dec. 14, 2006; Jie Zhang; office action dated Sep. 4, 2012.
U.S. Appl. No. 12/761,540, filed Apr. 16, 2010; Jie Zhang; office action dated Oct. 29, 2012.
U.S. Appl. No. 13/567,289, filed Aug. 6, 2012; Jie Zhang; office action dated Oct. 30, 2012.
Celaya et al; Control of a Six-Legged Robot Walking on Abrupt Terrain; Proceedings of the 1996 IEE International Conference on Robotics and Automation, Minneapolis, Minnesota; Apr. 1996; 6 pages.
Burg et al; Anti-Lock Braking and Traction Control Concept for All-Terrain Robotic Vehicles; Proceedings of the 1997 IEE International Conference on Robotics and Automation; Albuquerque, New Mexico; Apr. 1997; 6 pages.
U.S. Appl. No. 13/665,669, filed Oct. 31, 2012; Fraser Smith.
U.S. Appl. No. 12/814,304, filed Jun. 11, 2010; Stephen C. Jacobsen; office action dated Nov. 13, 2012.
U.S. Appl. No. 12/117,233, filed May 8, 2008; Stephen C. Jacobsen. office action dated Nov. 23, 2012.
U.S. Appl. No. 12/350,693, filed Jan. 8, 2009; Stephen C. Jacobsen; Notice of Allowance issued Sep. 20, 2012.
U.S. Appl. No. 13/181,380, filed Jul. 12, 2011; Stephen C. Jacobsen; Notice of Allowance dated Dec. 24, 2012.
PCT Application PCT/US2013/067840; filed Oct. 31, 2013; Raytheon Company; International Search Report mailed Aug. 29, 2014.
U.S. Appl. No. 12/814,304, filed Jun. 11, 2010; Stephen C. Jacobsen; Notice of Allowance mailed Sep. 10, 2014.
U.S. Appl. No. 12/814,304, filed Jun. 11, 2010; Stephen C. Jacobsen; office action dated May 22, 2014.

* cited by examiner

SERPENTINE ROBOTIC CRAWLER

BACKGROUND

Robotics is an active area of research, and many different types of robotic vehicles have been developed for various tasks. For example, unmanned aerial vehicles have been quite successful in military aerial reconnaissance. Less success has been achieved with unmanned ground vehicles, however, in part because the ground environment is significantly more difficult to traverse than the airborne environment.

Unmanned ground vehicles face many challenges when attempting mobility. Terrain can vary widely, including for example, loose and shifting materials, obstacles, vegetation, limited width or height openings, steps, and the like. A vehicle optimized for operation in one environment may perform poorly in other environments.

There are also tradeoffs associated with the size of vehicle. Large vehicles can handle some obstacles better, including for example steps, drops, gaps, and the like. On the other hand, large vehicles cannot easily negotiate narrow passages or crawl inside pipes, and are more easily deterred by vegetation. Large vehicles also tend to be more readily spotted, and thus can be less desirable, such as for discrete surveillance applications. In contrast, while small vehicles are more discrete, surmounting obstacles becomes a greater navigational challenge.

A variety of mobility configurations have been adapted to traverse difficult terrain. These options include legs, wheels, and tracks. Legged robots can be agile, but use complex control mechanisms to move and achieve stability. Wheeled vehicles can provide high mobility, but provide limited traction and require width in order to achieve stability.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A variety of robotic devices are known and have traditionally been configured with dedicated onboard control systems for controlling both the robotic device as well as various internal and external sensors. Such dedicated control systems can be complicated, costly, and difficult to reconfigure if modifications to the system are desired. For example, adding an external sensor can necessitate a reconfiguration of the dedicated control system. Robotic devices and robotic systems are disclosed that include non-dedicated smart control devices that can be associated therewith and that allow a high degree of customization. It is noted that, while much of the present disclosure describes serpentine robotic crawlers, the present scope includes any type of robotic system or device.

In some embodiments, for example, a serpentine robotic crawler is disclosed having a first drive subsystem, a second drive subsystem, and a multi-degree of freedom linkage subsystem coupling the first and second drive subsystems. A non-dedicated, smart control device can be supported (e.g., removably supported) about one of the first drive subsystem, the second drive subsystem, and the linkage subsystem, where the smart control device is configured to initiate and control operational functionality within the robotic crawler upon being connected to the robotic crawler. A communication subsystem can be functionally coupled between the smart control device and the serpentine robotic crawler, where the communication subsystem is operable to facilitate control by the smart control device of at least one of the first drive subsystem, the second drive subsystem, and the linkage subsystem.

Other exemplary embodiments of a serpentine robotic crawler are disclosed including a first drive subsystem, a second drive subsystem, a multi-degree of freedom linkage subsystem coupling the first and second drive subsystems, and a mount supported about one of the first drive subsystem, the second drive subsystem, and the linkage subsystem. The mount is configured to accept and support (e.g., removably support) a non-dedicated smart control device configured to initiate and control operational functionality within the robotic crawler upon being connected to the robotic crawler. A communication subsystem can be functionally coupled between the serpentine robotic crawler and the mount such that the robotic crawler and the smart control device are functionally coupled upon being connected. The communication subsystem facilitates control by the smart control device (once connected) of at least one of the first drive subsystem, the second drive subsystem, and the linkage subsystem.

Further exemplary embodiments of a serpentine robotic crawler system are disclosed including a serpentine robotic crawler having a first drive subsystem, a second drive subsystem, and a multi-degree of freedom linkage subsystem coupling the first and second drive subsystems. A non-dedicated, smart control device can be removably supported about one of the first drive subsystem, the second drive subsystem, and the linkage subsystem, where the smart control device is configured to initiate and control operational functionality within the robotic crawler upon being connected to the robotic crawler. A communication subsystem can be functionally coupled between the smart control device and the serpentine robotic crawler, where the communication subsystem is operable to facilitate control by the smart control device of at least one of the first drive subsystem, the second drive subsystem, and the linkage subsystem. The system can further include a smart control communication device operable to wirelessly communicate with the smart control device of the serpentine robotic crawler. In some embodiments, the system can also include the wireless communication medium, such as, for example, a cellular network.

Figure 1:
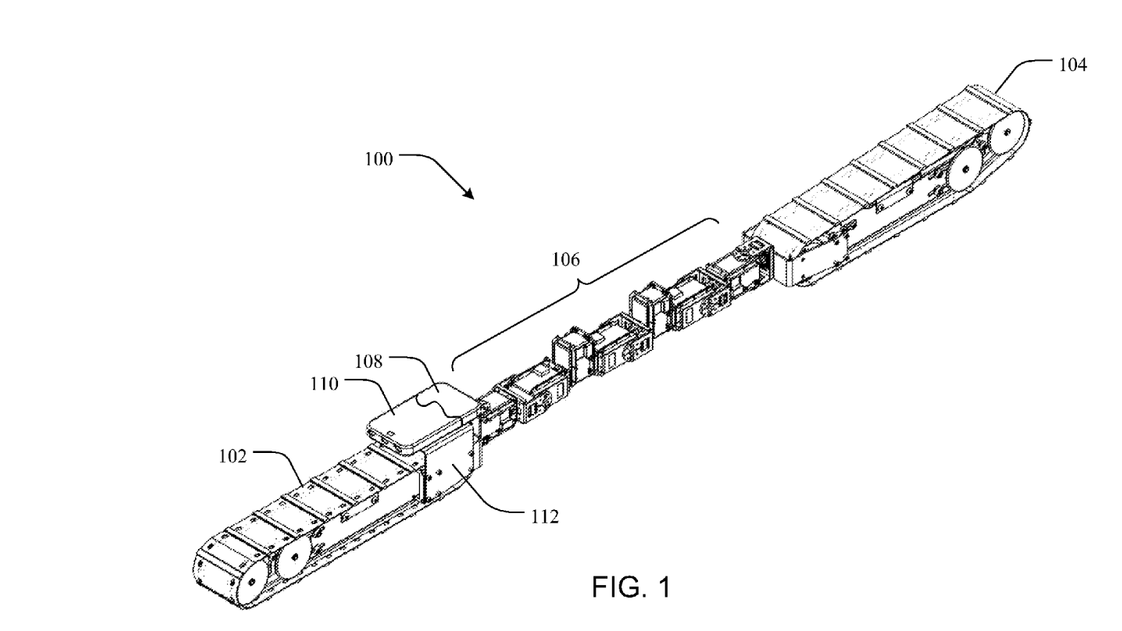
FIG. 1 is an example illustration of a robotic crawler in accordance with an example of the present disclosure.
Figure 2:
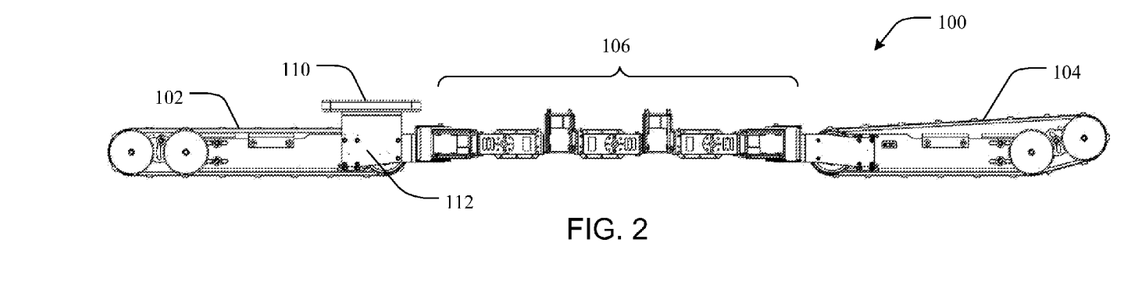
FIG. 2 is a side view of the robotic crawler of FIG. 1 in accordance with an example of the present disclosure.
Figure 7A:
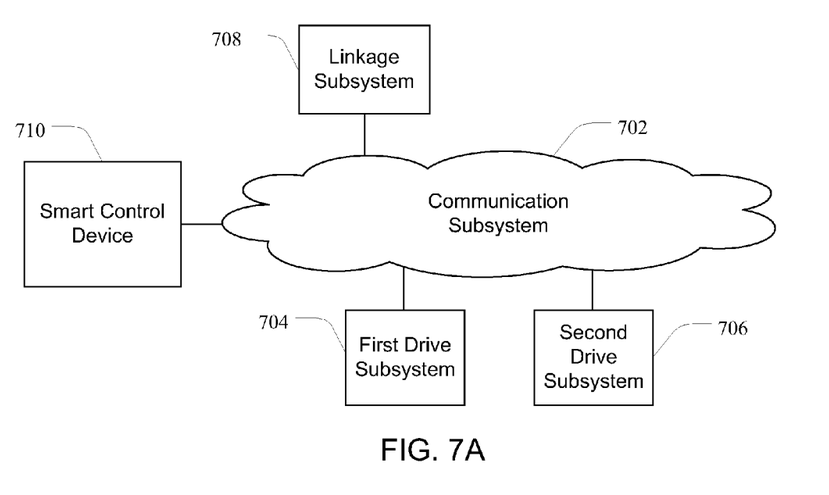
FIG. 7A-B are example schematics of communication subsystem configurations in accordance with another example of the present disclosure.

One exemplary embodiment of a serpentine robotic crawler is illustrated in FIGS. 1 and 2. The serpentine robotic crawler 100 can include a first drive subsystem 102 and a second drive subsystem 104. A multi-degree of freedom linkage subsystem 106 can be coupled between the first drive subsystem 102 and second drive subsystem 104. A non-dedicated, smart control device 108 can be removably supported about one of the first drive subsystem 102, the second drive subsystem 104, and the linkage subsystem 106, wherein in this case the smart control device 108 is supported about the first drive subsystem 102. The smart control device 108 can be coupled to the serpentine robotic crawler 100 by any useful coupling technique, including, for example, a physical mount 110. The physical mount 110 can be coupled to the robotic crawler in a variety of ways, all of which are included or contemplated in the present scope. FIGS. 1 and 2 show one example of a mounting bracket 112 coupled between the physical mount 110 and the first drive subsystem 102. The physical mount 110 can provide additional functionality, such as a protective case, shock absorption, etc., depending upon its configuration. Additionally, while shown coupled to the first drive subsystem 102, the smart control device 108 can be coupled anywhere on the robotic crawler, including the second drive subsystem 104 or the linkage subsystem 106. A communication subsystem (see FIG. 7A) can be functionally coupled between the smart control device 108 and the serpentine robotic crawler 100 to facilitate control by the smart control device 108 of at least one of the first drive subsystem 102, the second drive subsystem 104, and the linkage subsystem 106. The design of the physical mount 110 can thus vary depending on the communication medium between the smart control device and the robotic crawler. In some aspects, the physical mount 110 can be primarily a physical support structure. Such may be the case for wireless communication between the smart control device 108 and the robotic crawler. In other aspects, the physical mount 110 can also include or support a physical communication connector such as a pinned connection or other type of physical connector for interfacing with the smart control device 108. Such may be the case for wired communications between the smart control device 108 and the robotic crawler.

Figure 3:
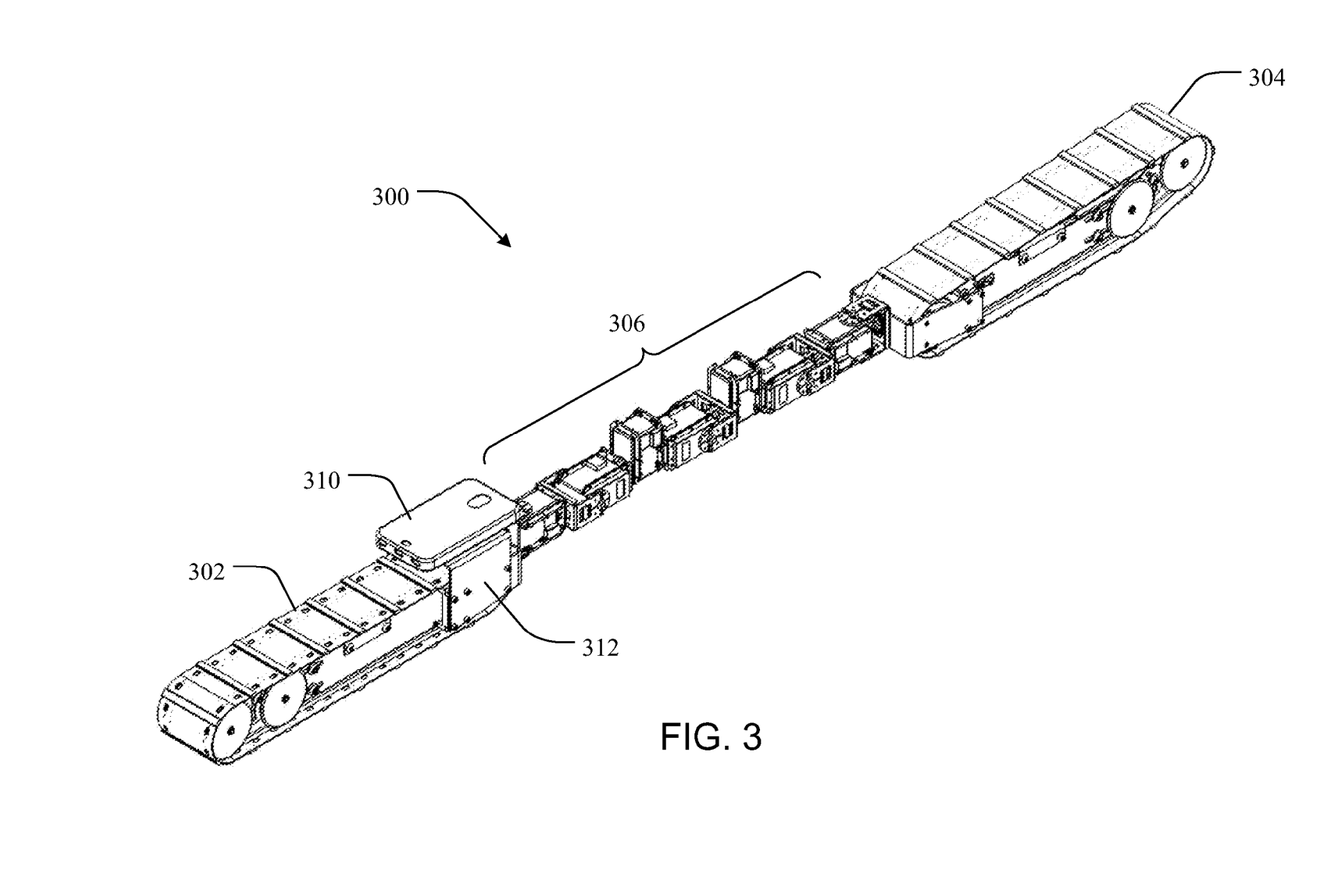
FIG. 3 is an example illustration of a robotic crawler in accordance with another example of the present disclosure.

In another exemplary embodiment, as is shown in FIG. 3, a serpentine robotic crawler 300 can include a first drive subsystem 302 and a second drive subsystem 304. A multi-degree of freedom linkage subsystem 306 can be coupled between the first drive subsystem 302 and second drive subsystem 304. A mount 310 can be supported about at least one of the first drive subsystem 302, the second drive subsystem 304, and the linkage subsystem 306. The mount 310 can be configured to accept and removably support a non-dedicated smart control device (108, FIG. 1) configured to initiate and control operational functionality within the robotic crawler 300 upon being connected to the robotic crawler 300. A communication subsystem (see FIG. 7A) can be functionally coupled between the serpentine robotic crawler 300 and the mount 310 such that the robotic crawler and the smart control device are functionally coupled upon connection. The communication subsystem facilitates control by the smart control device (once connected) of at least one of the first drive subsystem 302, the second drive subsystem 304, and the linkage subsystem 306.

Various first and second drive subsystems are contemplated, and any useful drive mechanism is considered to be within the present scope. Additionally, it is also contemplated that the first drive subsystem can utilize the same drive mechanism as the second drive subsystem, or the first drive subsystem can utilize a different drive mechanism as the second drive subsystem. Non-limiting examples of drive mechanisms can include tracks, wheels, constriction-mediated movement devices, propellers, and the like. In one specific embodiment, the first and second drive subsystems can be a continuous track that is movable about a support frame.

As has been described, the serpentine robotic crawler can include a linkage subsystem having a multi-degree of freedom linkage. One exemplary embodiment of such a device is shown in FIGS. 1-3. Shown in FIG. 3, for example, are a first drive subsystem 302, a second drive subsystem 304, and a linkage subsystem 306 having a multi-degree of freedom linkage. The linkage subsystem 306 thus couples the first and second drive subsystems 302, 304 together in tandem. The linkage subsystem 306 can thus bend, rotate, turn, etc., thus altering the direction that either the first and second drive subsystems 302, 304 are oriented relative to one another. Accordingly, the robotic crawler can be steered by altering the direction of either of the drive subsystems prior to or during movement.

It should be recognized that the joints and/or linkages of the linkage subsystem discussed herein can be actuated or passive, in any combination. In one aspect, a passive joint or linkage can be manipulated or movable to a selectively fixed position and held in place, for example, by incorporating an adjustable fastener. In another aspect, a passive joint or linkage can include a dampener and/or a spring to control various aspects (e.g., those related to movement) of the joint or linkage.

With respect to the linkage subsystem, various other configurations are also possible for embodiments of a serpentine robotic crawler. In general, the linkage subsystem can include up to nine actuated joints providing motion about nine different axes (although some of these axes may be aligned with each other at times). These joints can be uni-axial, bi-axial, or tri-axial joints. In one exemplary embodiment, the linkage arm can comprise nine degrees of freedom, and can include a series coupled combination of any of the following:

9 uni-axial joints
    5 uni-axial joints and 2 bi-axial joints
    3 uni-axial joint and 2 tri-axial joints
    2 uni-axial joints, 2 bi-axial joints, and 1 tri-axial joint For example, a linkage arm can include a series combination of seven uni-axial bending joints and two uni-axial rotary joints. For example, six bending joints can be symmetrically disposed about a seventh bending joint located in the center of the linkage, three bending joints on each side of the center. The rotary joints can also be symmetrically disposed about the center. For example, the rotary joints can be located adjacent to the seventh (centered) bending joint, located between the symmetrically disposed bending joints, or located adjacent to the frames.

Of course, other linkage subsystems are possible and contemplated herein, such as linkage subsystems that facilitate between 1 and 9 degrees of freedom, or even additional degrees of freedom above nine.

Alternately, bi-axial joints, which provide the same degrees of freedom as two uni-axial joints in series, or tri-axial joints, which provide the same degrees of freedom as three uni-axial joints in series, can also be used. A bi-axial joint can, for example, provide bending in two axes. These axes can, but need not be, orthogonal. A tri-axial joint can, for example, provide bending in two lateral axes and rotation about a third longitudinal axis.

Joints need not be limited to revolute joints which provide bending or rotational movement. Prismatic joints that provide translational movement can also be included. Joints may incorporate both revolute and prismatic features to provide, for example, eccentric motions.

In one embodiment, at least one of the first and second drive subsystems can include a drive to facilitate rotation, bending, and/or movement of the various components of the linkage subsystem. Similarly, at least one drive can be utilized to facilitate movement of at least one of the drive subsystems. In some aspects, the drive that actuates at least one of the drive subsystems can also actuate all or a portion of the linkage subsystem. In other words, the same drive that causes movement of a drive subsystem can also cause movement of an associated part of the linkage subsystem. In other aspects, the drive that facilitates rotation, bending and/or movement of the components of the linkage subsystem can be a dedicated drive. As will be recognized by those skilled in the art once in possession of the present disclosure, various types of drives and coupling techniques for applying drive power to a drive subsystem or a linkage subsystem can be utilized.

Further details regarding drive subsystems, linkage subsystems, and robotic crawlers can be found in U.S. patent application Ser. No. 13/481,631, filed on May 25, 2012, which is incorporated herein by reference herein in its entirety.

Figure 4:
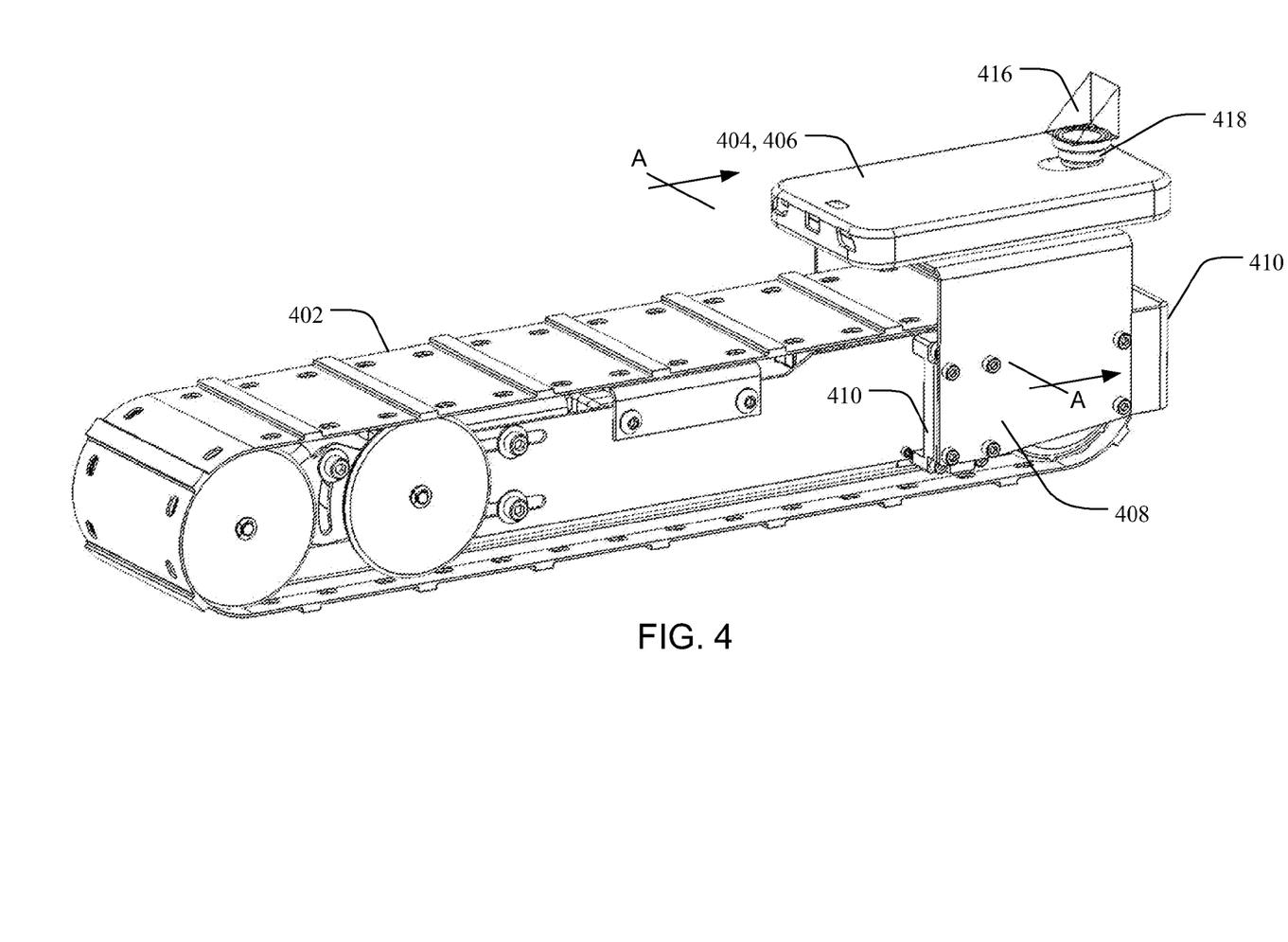
FIG. 4 is an example illustration of a drive subsystem from a robotic crawler in accordance with yet another example of the present disclosure.
Figure 5:
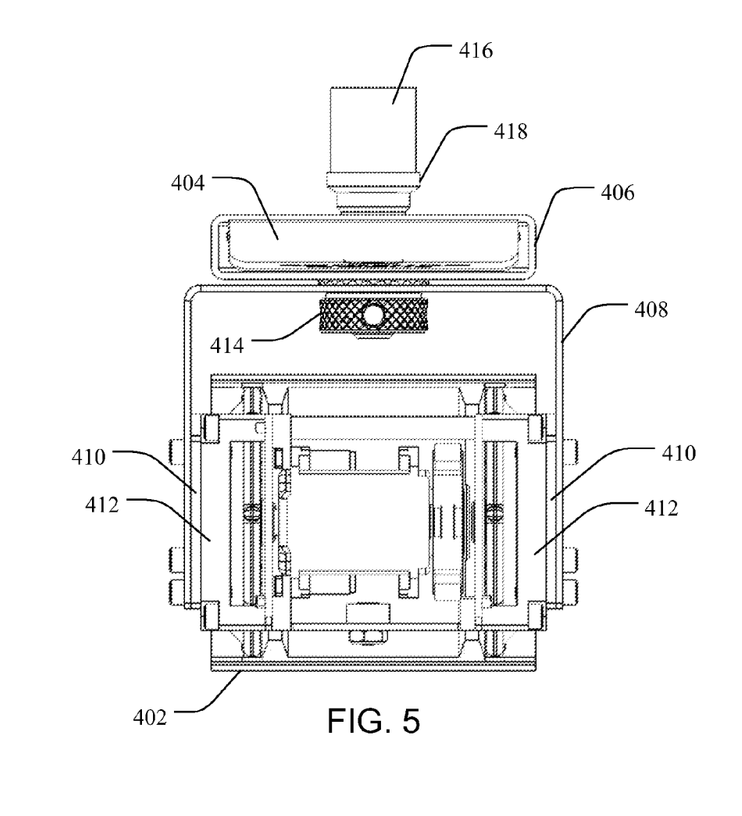
FIG. 5 is a cross section through the drive subsystem of FIG. 4.
Figure 6:
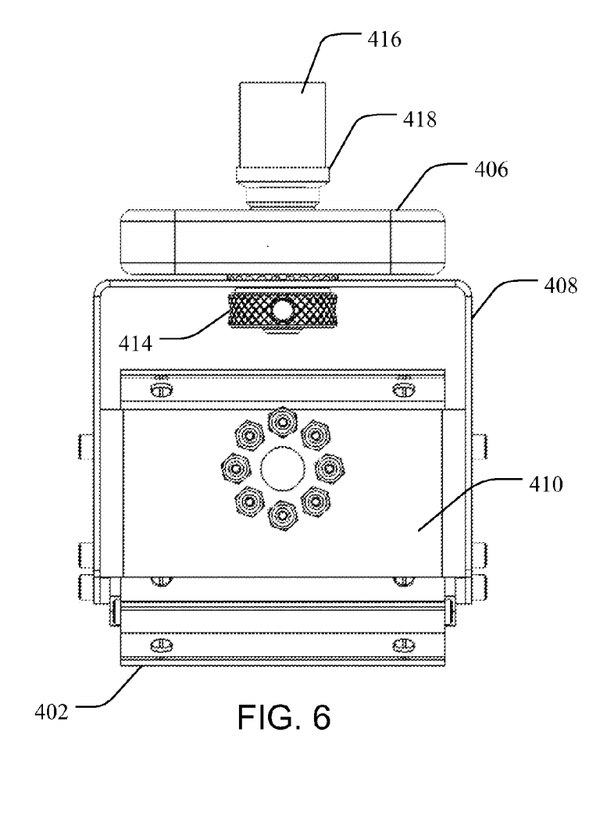
FIG. 6 is an end view of the drive subsystem of FIG. 4.

Turning to FIGS. 4-6, a drive subsystem 402 is shown having a smart control device 404 positioned within a mount 406. As has been described, the mount 406 can be coupled to the drive subsystem 402 by any known means. In the embodiment shown in FIGS. 4-6, the mount 406 is coupled to the drive subsystem 402 via a mounting bracket 408. The mounting bracket 408 can couple directly to the drive subsystem 402, or the mounting bracket 408 can be coupled via an intermediate member. In the embodiment shown in FIGS. 4-6, for example, the mounting bracket 408 can be coupled to a linkage bracket 410. The linkage bracket 410 is used to link the drive subsystem 402 to the linkage subsystem (not shown). It is noted, however, that the mounting bracket 408 can be linked to the drive subsystem by other means, either directly or indirectly.

FIG. 5 shows a view of section A-A through the drive subsystem 402 of FIG. 4 (with FIG. 6 being a view from the rear or back of the drive subsystem 402). With reference to FIGS. 5 and 6, in this particular embodiment, the mounting bracket 408 is a u-shaped structure that supports the mount 406 and the smart control device 404. The mounting bracket 408 is shown mounted to the linkage bracket 410, which is in turn coupled to a support frame 412 of the drive subsystem 402. The mount 406 is coupled to the mounting bracket in this embodiment by a nut 414. Thus, a threaded connection from the mount 406 passes through a hole in the mounting bracket 408 to engage the nut 414. In other embodiments, a thumb-screw can be passed through the hole in the mounting bracket 408 and into a threaded connection in the mount 406. It is also understood that the connections between the mount, the mounting bracket, and the drive subsystem can vary by design and preference while still being within the present scope.

In some embodiments, a smart control device having a built in camera (e.g., digital camera) can be used to provide optical sensing and visual input to the robotic crawler. It is possible to move the smart control device and thus the camera relative to the robotic controller in order to expand the visualization area of the system. Such movements of the smart control device can be hazardous when the robot is in use, however, depending on the location and orientation of the camera. For example, if the smart control device is a smart phone, the camera is most likely located with a focal axis that is perpendicular to the planar orientation of the phone. By rotating the phone so that the focal axis of the camera is parallel to the body axis of the robotic crawler, the planar orientation of the phone is now perpendicular to the body axis of the robotic crawler and the cross section of the robotic crawler is increased by at least the width or length of the phone. This increase in cross-section may not be problematic for some uses, but may limit the size of openings into which the robot can travel.

In some embodiments, the focal axis of the camera, which can be a digital or any other type of camera, can be reoriented without moving the smart control device. As is shown in FIGS. 4-6, a prism 416 or other light-reorienting lens can be optically coupled to the camera subunit. The prism 416 shown in FIG. 4, for example, bends the focal axis of the camera to allow viewing in alternate directions. If the prism is a 45° prism, the focal axis of the camera is bent by 90°, and thus would be oriented along the axis of the robotic crawler 402 without rotating or otherwise moving the smart control device 404 or mount 406. Additionally, in some embodiments the prism 416 can be mounted on a movable and/or rotatable prism mount 418 that can facilitate further movement and reorientation of the focal axis without moving the smart control device 404 or mount 406.

Movement of the smart device and/or the mount itself is/are also contemplated. Indeed, the mount and/or mounting bracket coupling or supporting the smart device about the robotic device can comprise a dynamic configuration. For example, the mount and/or mounting bracket can comprise elements configured to rotate, pivot, pitch, bend, extend, retract, translate, etc. relative to the robotic device (thus causing associated movement of the smart control device) depending upon the particular configuration of the mount and/or mounting bracket. In other embodiments, the smart control device can be concealable within the robotic device, and selectively deployed if necessary. Various support or mounting mechanisms can be employed to facilitate this function.

Figure 9:
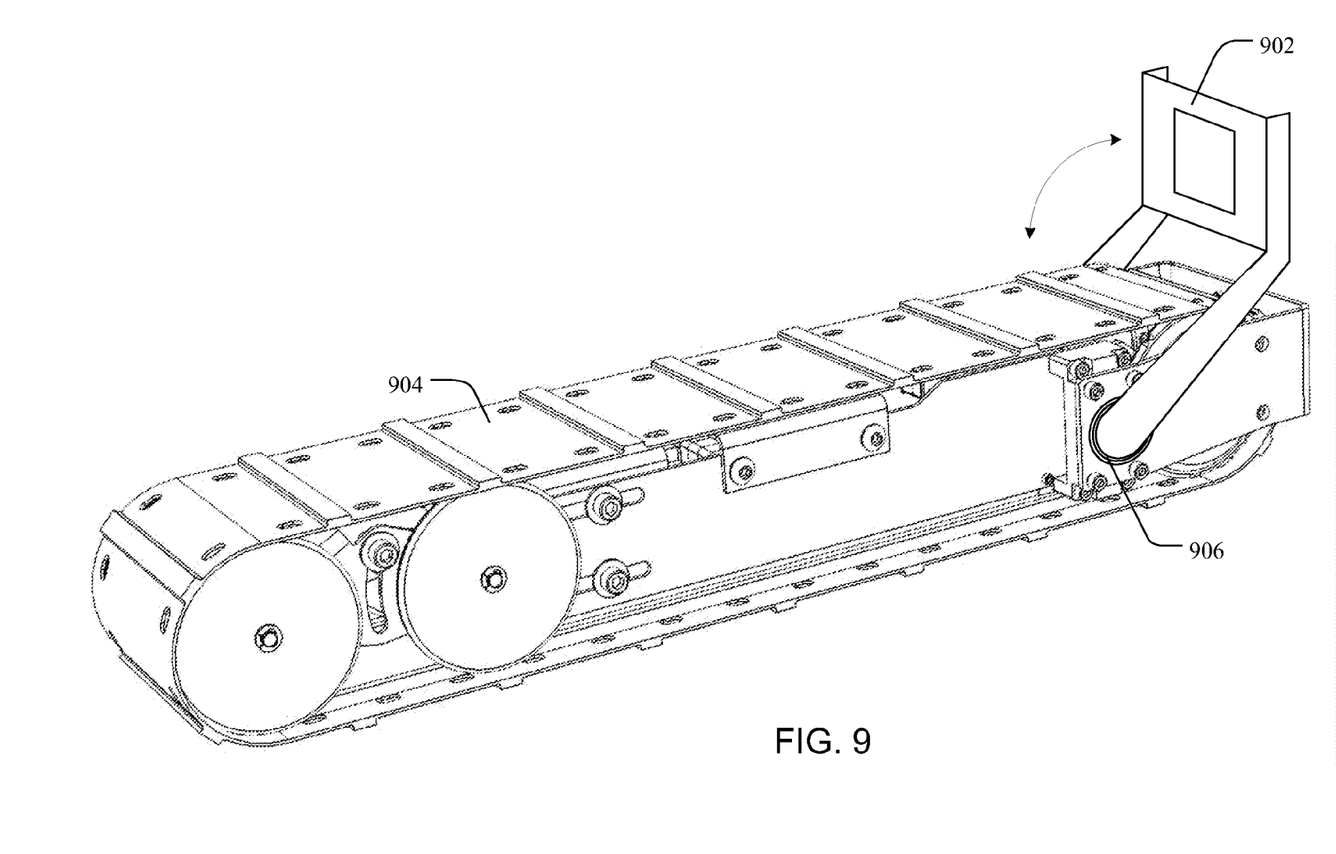
FIG. 9 is an example illustration of a drive subsystem from a robotic crawler in accordance with yet another example of the present disclosure.

One example of a dynamic or moveable mount for a smart control device is shown in FIG. 9. In this case, a retractable mount 902 is pivotally coupled to a drive subsystem 904, and configured to receive and support a smart control device as discussed herein. The retractable mount 902 can be raised and lowered by a mount motor 906 or other device capable of providing motion to the retractable mount 902. As such, a smart control device (not shown) coupled to the retractable mount 902 can be raised and lowered depending on environmental circumstances and/or user initiated commands. It is noted that the retractable mount 902 be designed to correspond to a given smart control device, and as such, numerous retractable mount configurations are contemplated.

As has been described, robotic devices according to aspects of the present disclosure can be designed such that logic processing, command execution, data processing, sensing, or any other "smart" function are performed on a non-dedicated smart control device, and in many cases one that is removable. By non-dedicated it can mean at least one of non-integrated, not built-in, and/or removable relative to the robotic crawler. By operating a smart control device with a robotic crawler, "smart" functions can be performed on the smart control device as opposed to a dedicated system, such as one that is fully integrated into (and perhaps non-removable from) the robotic crawler. In other words, the dedicated control, sensing, and processing operations (i.e., "smart" functions) that have been previously performed by the robotic crawler can now be more efficiently performed on the smart control device, with a significant amount, if not all, of the "smart" functionality of various integrated systems being packaged in the smart control device. Various advantages are provided by doing this. For example, a damaged smart control device can thus be easily removed and replaced without significant downtime for diagnostics and repair procedures, the smart control device can also be removed from the robotic crawler in order to facilitate reprogramming, data manipulation, and the like. It should be noted that a non-dedicated smart control device can include a pre-existing device (e.g., a smart phone) adapted for use with the serpentine robotic crawler, or one built specifically for use with the robotic crawler. Moreover, the smart control device can comprise a self-contained device independent of the robotic crawler configured to support at least some, if not all, of the components needed to facilitate "smart" functionality within the robotic crawler. In other words, the smart control device can itself comprise a housing, a framework or chassis, with all of the internal logic, circuitry, and other components needed to provide the "smart" functions within the robotic crawler.

Various smart control devices are contemplated, and any such device capable of controlling a robotic crawler is considered to be within the present scope. Non-limiting examples of smart control devices can include cellular devices, wireless network devices, Bluetooth devices, and the like, including combinations thereof. In one aspect, the smart control device can be a cellular phone, such as a smart phone. In general, many smartphones contain sufficient computational resources and other "smart" functionality capable of controlling and interfacing with the robotic crawler, including movement of the drive subsystems, movement of the linkage subsystem, sensing and sensor data processing, data processing, video, audio, and the like. As such, a smart control device can allow enhanced functionality of a robotic crawler without the need for complex integrated control and processing systems.

In addition to control functionality, the smart control device provides benefits due to its removability from the robotic crawler. For example, upgrades, programming modifications, and the like can be accomplished remote from the robotic crawler on the smart control device, which can then be physically and/or electrically (including wirelessly) coupled to the robotic crawler. As such, the smart control device can be "plug-and-play," and thus can provide functionality to the robotic crawler upon connection thereto. It is important to note that the smart control device is not merely a remote control for the crawler, but rather is a computational device residing on the crawler capable of carrying out commands, gathering and processing data, some level of programmed decision making, and the like.

Furthermore, data collected by sensors or other devices on the robotic crawler can be stored as well as processed on the smart control device. Data can be removed from the robotic crawler by merely removing the smart control device, upon which the data is resident. Additionally, data can be transmitted from the smart control device to a remote location over a medium such as, for example, a cellular network. For those aspects utilizing a cellular device such as a smartphone, the cellular functionality is already resident on the smartphone, which can be readily utilized for communication to and from the smartphone.

Control and operation of a serpentine robotic crawler by way of a smart control device will now be discussed in further detail. Movement and pose of a serpentine robotic crawler can be controlled through articulation of the linkage subsystem and actuation of the drive subsystems. Accordingly, as shown in schematic form in FIG. 7A, the communication subsystem 702 can be functionally coupled to the first drive subsystem 704, the second drive subsystem 706, and the linkage subsystem 708. The communication subsystem is also functionally coupled to the smart control device 710. As such, commands from the smart control device 710 can be delivered to the first drive subsystem 704, the second drive subsystem 706, and the linkage subsystem 708 in order to control the movement and positioning of the robotic crawler. Similarly, feedback communication (e.g. from position and/or movement sensors) from the first drive subsystem 704, the second drive subsystem 706, and the linkage subsystem 708 can be delivered to the smart control device 710 via the communication subsystem 702. Thus, the smart control device 710 can be in communication with each component of the robotic crawler via the communication subsystem 702 to facilitate selective or concurrent actuation.

It is noted that the communication subsystem can be comprised of any communication medium capable of controlling the robotic crawler. Non-limiting examples of such communication media can include electrical coupling, optical coupling, wireless coupling, Bluetooth coupling, and the like, including combinations thereof. As such, the type of communication medium may dictate the structure of the communication subsystem itself For example, a communication subsystem utilizing electrical coupling can include wired connections from the various components of the robotic crawler. A communication subsystem utilizing wireless communication, on the other hand, can include a series of transmitters and receivers coupling the smart control device to the various subsystems.

Additionally, in some aspects the smart control device can provide enhanced functionality to the robotic crawler. Such functionality is only limited by the capabilities of the particular smart control device being used. For example, using a smart phone allows the functionality available to and/or on the smart phone to be utilized in the control and operation of the robotic crawler. For example, a smartphone can provide wireless communication to the crawler, wireless communication external to the crawler, GPS data, accelerometer data, vibration detection, a user interface, camera and/or video functionality, audio input, audio output, sensor processing, navigation, control, and the like, including combinations thereof. Additionally, applications can be created for the smartphone that enhance the functionality of the crawler. Such applications can be very dynamic in nature, and can be updated directly to the smartphone without the need for disconnection or rebooting. Accordingly, a smartphone can provide similar functionality as a dedicated control system at a fraction of the cost, with an enhanced capability of dynamic reconfiguration, and built-in communication with a user over a wireless network, such as a cellular, Bluetooth, or Wi-Fi network to name a few.

As has been described, the smart control device can be any device with sufficient computational resources to control a robotic crawler according to aspects of the present disclosure. In some cases, the smart control device can be self-contained, portable, and allow independent user interaction separate from the robotic crawler. Thus the crawler can be left in one environment while changes are made to the smart control device in another environment. The smart control device can also be considered to be a general purpose communication device having its own form factor. Utilizing such a device having built-in communication capabilities can greatly simplify the design and cost of a robotic crawler. Additionally, the smart control device can be disposed of and replaced with another unit for comparably low cost and effort.

Figure 7B:
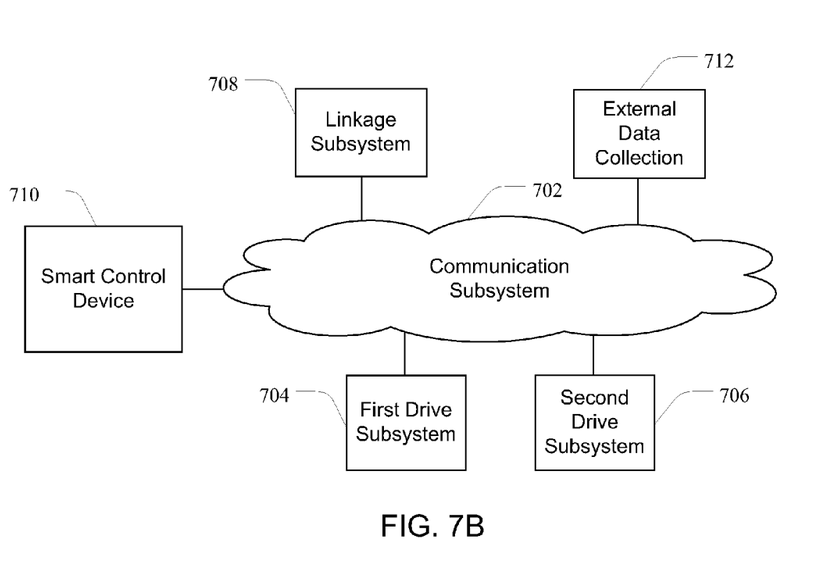

As is shown in FIG. 7B, the communication subsystem 702 can also provide communication between any external data collection devices 712 (i.e. sensors) and the smart control device 710. Such ancillary external data collection devices can be devices or systems utilized to collect data from or otherwise manipulate the environment external to the crawler. Non-limiting examples of such can include measurement devices or systems, inspection devices or systems, mass spectrometers, ion mobility sensors, chemiluminescent sensors, electron capture detection devices, electrochemical analyzers, specialized gas sensors, (spectroscopy—methane, propane, ammonia, CO, smoke, etc.), surface acoustic wave sensors, tactile whiskers, radiation detectors, metal detectors, other detector types, magnetometers, inertial measurement units, non-destructive inspection methods (X-Ray, dye penetrant, ultrasonic, eddy current, magnetic particle, interferometry), additional cameras (e.g. certain portions of the EM spectrum), and the like, including associated applications to handle the processing, storage and real-time or eventual communication and use of the results. In some aspects, the external data collection device can be an additional non-dedicated smart control device, such as, for example, a smart phone.

As has been described, the robotic crawler can include at least one camera in addition to any camera/video of the smart control device. For example, cameras having a higher resolution as compared to the smart control device can be supported about and operable with the robotic crawler. Also, cameras and/or camera filters sensitive to desired portions of the electromagnetic spectrum can be associated with the robotic crawler to obtain data that may not be available to the smart control device's onboard imaging system, such as, for example, IR, UV, x-ray, gamma ray, microwave, and the like. Similarly, the robotic crawler can also include at least one audio pic-up device in addition to any audio system on board the smart control device for enhanced audio data collection. Furthermore, in some aspects data from the camera and/or the audio pickup can be delivered through the smart control device to an external source, such as, for example, a smart control communication device.

In some embodiments, the present disclosure can include a robotic crawler system capable of remote control and access by a user. As one example, as shown in schematic form in FIG. 8, the communication subsystem 802 can be functionally coupled to the first drive subsystem 804, the second drive subsystem 806, and the linkage subsystem 808, similar to that described and shown in FIG. 7A. The communication subsystem 802 is also functionally coupled to the smart control device 810. The functional coupling can optionally include a physical interface 812. As such, commands from the smart control device 810 can be delivered to the first drive subsystem 804, the second drive subsystem 806, and the linkage subsystem 808 in order to control the movement and positioning of the robotic crawler. Similarly, feedback communication (e.g. from position and/or movement sensors) from the first drive subsystem 804, the second drive subsystem 806, and the linkage subsystem 808 can be delivered to the smart control device 810 via the communication subsystem 802. Thus, the smart control device 810 can be in communication with each component of the robotic crawler via the communication subsystem 802 to facilitate selective or concurrent actuation.

Figure 8:
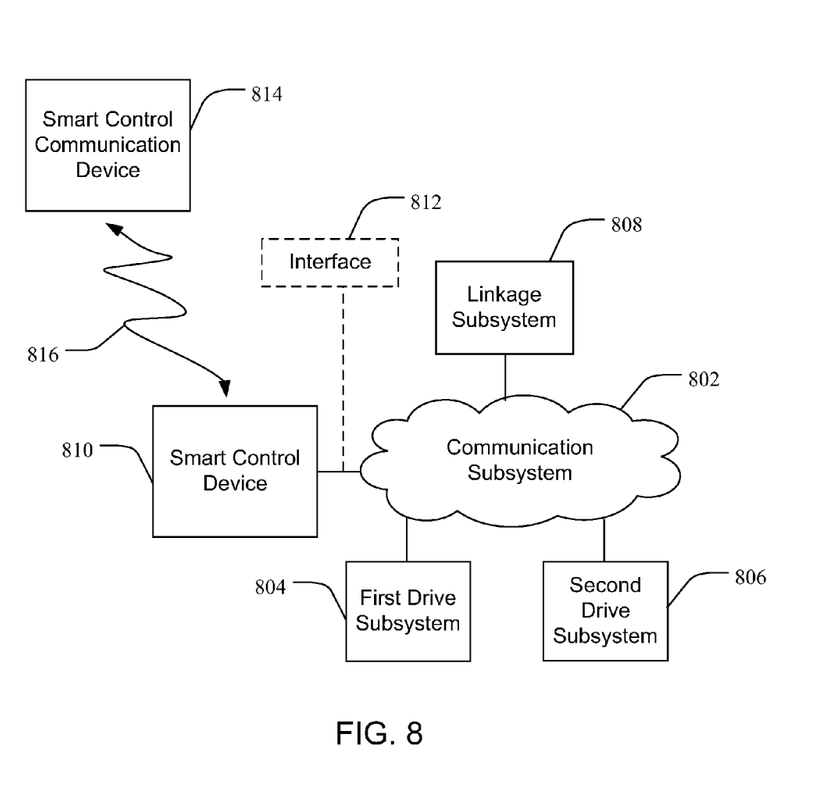
FIG. 8 is an example schematic of a robotic crawler system controllable by a remote user in accordance with yet another example of the present disclosure.

The system can further include a smart control communication device 814 operable to wirelessly communicate with the smart control device 810 of the serpentine robotic crawler. As such, in some aspects the smart control communication device 814 functions as a user interface to allow a user to provide control instructions to the smart control device 810. In some embodiments, the system can also include the wireless communication medium, such as, for example, a cellular network 816. As such, a user can provide communication to the smart control device 810 via the smart control communication device 814 in order to control the robotic crawler. The data from the various sensors on the robotic crawler can further be transmitted by the smart control device 810 back to the smart control communication device 814. Thus data from sensors, video and/or audio from the integrated hardware of the smart control device, and the like can be communicated to the user, where further control commands can be delivered. It is noted that the wireless communication medium can include any known wireless communication medium including, without limitation, cellular communication, Wi-Fi communication, Bluetooth communication, and the like, including combinations thereof.

The smart control communication device can include any appropriate device capable of sending and receiving commands to and from the smart control device. Non-limiting examples of such communication devices can include cellular phones, smart phones, tablet pcs, tablet devices, laptop computers, desktop computers, and the like. Additionally, in some embodiments the smart control communication device can include a replica master for control of the robotic crawler. In a replica master control system, a replica master is located remotely from the robotic crawler. The replica master can contain the same joints as the serpentine robotic crawler, and can be manually manipulated into the desired poses. Sensors located at the joints sense the position of the joints, and these positions are communicated to the smart control device to actuate the linkage and drive subsystems to attempt to establish the same pose. Optionally, the joints in the linkage subsystem can include force sensors, torque sensors, or both, allowing the force and/or torque on the joints to be measured. The joint forces and/or torques can optionally be communicated back to the replica master, providing force feedback into the control system. Various force feedback control systems are known which can be applied to embodiments of the present invention.

The smart control device can be integrated into the robotic crawler to allow the crawler to operate autonomously, in some cases for an extended period of time. In one embodiment, the system can include distributed joint and track controllers that locally control one or more closely associated joints. Distributed joint and track controllers can communicate with the smart control device, which can subsequently be communicated to the smart control communication device.

As another example, various movement primitives can be preprogrammed into the smart control device, including for example primitives to assume certain poses (e.g., tank, train, or climbing configurations), and primitives for movement (e.g., forward, backwards). Control can include feedback from joint force sensors and environmental sensors. In this way, hybrid human and automated control can be combined. For example, high-level manual commands/primitives can be implemented using automated low-level feedback loops that execute the commands/primitives. Control function can be divided into subsystems, including for example, pose control, compliance control, movement control, force control, and hybrid combinations thereof.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A serpentine robotic crawler, comprising:
a first drive subsystem;
a second drive subsystem;
a multi-degree of freedom linkage subsystem coupling the first and second drive subsystems;
a non-dedicated, smart control device supported about one of the first drive subsystem, the second drive subsystem, and the linkage subsystem, the smart control device providing smart functionality to initiate and control operational functionality within the robotic crawler; and
a communication subsystem functionally coupled between the smart control device and the serpentine robotic crawler, the communication subsystem facilitating control by the smart control device of at least one of the first drive subsystem, the second drive subsystem, and the linkage subsystem.

2. The serpentine robotic crawler of claim 1, wherein the smart control device is a member selected from the group consisting of cellular devices, wireless network devices, Bluetooth devices, and combinations thereof.

3. The serpentine robotic crawler of claim 1, wherein the smart control device is a smart phone.

4. The serpentine robotic crawler of claim 1, wherein the smart control device is operable to independently control the first drive subsystem, the second drive subsystem, and the linkage subsystem.

5. The serpentine robotic crawler of claim 1, wherein the communication subsystem includes a communication medium selected from the group consisting of electrical coupling, optical coupling, wireless coupling, Bluetooth coupling, or a combination thereof.

6. The serpentine robotic crawler of claim 1, wherein the smart control device provides a functionality to the serpentine robotic crawler selected from the group consisting of wireless communication to the crawler, wireless communication external to the crawler, GPS data, accelerometer data, vibration detection, a user interface, camera and/or video functionality, audio input, audio output, sensor processing, navigation, control, or a combination thereof.

7. The serpentine robotic crawler of claim 1, wherein the smart control device further includes an integrated digital camera.

8. The serpentine robotic crawler of claim 7, further comprising a lens optically coupled to the digital camera, the lens being operable to bend a focal axis direction of the digital camera.

9. The serpentine robotic crawler of claim 8, wherein the lens is operable to rotate such that the focal axis direction of the digital camera can be rotated.

10. The serpentine robotic crawler of claim 1, wherein the smart control device is supported about one of the first drive subsystem or the second drive subsystem.

11. The serpentine robotic crawler of claim 1, further comprising at least one external data collection device coupled to the serpentine robotic crawler.

12. The serpentine robotic crawler of claim 11, wherein the at least one external data collection device is operable to interface with the smart control device via the communication subsystem.

13. A serpentine robotic crawler, comprising:
a first drive subsystem;
a second drive subsystem;
a multi-degree of freedom linkage subsystem coupling the first and second drive subsystems;
a mount supported about one of the first drive subsystem, the second drive subsystem, and the linkage subsystem, the mount being operable to accept and removably support a non-dedicated smart control device that provides smart functionality to initiate and control operational functionality within the robotic crawler; and a communication subsystem functionally coupled between the serpentine robotic crawler and the smart control device upon being connected, the communication subsystem facilitating control by the smart control device of at least one of the first drive subsystem, the second drive subsystem, and the linkage subsystem.

14. The serpentine robotic crawler of claim 13, wherein the mount is configured to interface with a smart control device that is a member selected from the group consisting of cellular devices, wireless network devices, Bluetooth devices, and combinations thereof.

15. The serpentine robotic crawler of claim 13, wherein the mount is configured to interface with a smart phone.

16. A serpentine robotic crawler system, comprising:
the serpentine robotic crawler of claim 1;
a smart control communication device operable to wirelessly communicate with the smart control device of the serpentine robotic crawler.

17. The system of claim 16, wherein wirelessly communicating includes sending control instructions to the smart control device of the serpentine robotic crawler.

18. The system of claim 16, wherein wirelessly communicating includes receiving communication signals from the smart control device of the serpentine robotic crawler.

19. The system of claim 18, wherein the communication signals can include at least one of positional data, acceleration data, external sensor data, diagnostic data, video data, or audio data.

20. The system of claim 16, wherein the smart control communication device and the smart control device of the serpentine robotic crawler are operable to communicate across a cellular network.

* * * * *